US009652446B2

(12) United States Patent
Creason et al.

(10) Patent No.: US 9,652,446 B2
(45) Date of Patent: May 16, 2017

(54) AUTOMATICALLY ADJUSTING SPREADSHEET FORMULAS AND/OR FORMATTING

(71) Applicant: Smartsheet Inc., Bellevue, WA (US)

(72) Inventors: John D. Creason, Woodinville, WA (US); Mark P. Mader, Seattle, WA (US); Thomas P. Maliska, Jr., Olympia, WA (US); Erik Rucker, Seattle, WA (US)

(73) Assignee: Smartsheet Inc., Bellevue, WA (US)

( * ) Notice: Subject to any disclaimer, the term of this patent is extended or adjusted under 35 U.S.C. 154(b) by 32 days.

(21) Appl. No.: 14/574,003

(22) Filed: Dec. 17, 2014

(65) Prior Publication Data

US 2016/0055139 A1   Feb. 25, 2016

Related U.S. Application Data

(60) Provisional application No. 62/040,992, filed on Aug. 22, 2014.

(51) Int. Cl.
*G06F 17/24* (2006.01)

(52) U.S. Cl.
CPC .................. *G06F 17/246* (2013.01)

(58) Field of Classification Search
CPC ...... G06F 17/246; G06F 17/211; G06F 17/24; G06F 17/245

See application file for complete search history.

(56) References Cited

U.S. PATENT DOCUMENTS

| | | | | |
|---|---|---|---|---|
| 5,255,356 A | * | 10/1993 | Michelman | G06F 17/246 715/212 |
| 5,553,215 A | * | 9/1996 | Kaethler | G06F 17/246 715/219 |
| 7,127,672 B1 | * | 10/2006 | Patterson | G06F 17/246 715/220 |
| 2002/0004801 A1 | * | 1/2002 | Todd | G06F 17/246 715/212 |
| 2002/0161799 A1 | * | 10/2002 | Maguire, III | G06F 17/246 715/212 |

(Continued)

FOREIGN PATENT DOCUMENTS

WO   02/057932 A1   7/2002

OTHER PUBLICATIONS

International Search Report and Written Opinion mailed Feb. 18, 2016, issued in corresponding International Application No. PCT/US2015/043290, filed Jul. 31, 2015, 8 pages.

(Continued)

*Primary Examiner* — Wilson Tsui
(74) *Attorney, Agent, or Firm* — Christensen O'Connor Johnson Kindness PLLC

(57) ABSTRACT

In some embodiments, a computer-implemented spreadsheet management method is provided that automatically copies formatting and formulas from appropriate peer rows to an updated row. In some embodiments, the method automatically determines which peer rows, if any, should be used as the source of copied formatting and formulas. In some embodiments, the method automatically fixes formulas that are affected by the updated row in order to maintain consistency throughout the spreadsheet.

18 Claims, 8 Drawing Sheets

(56) References Cited

U.S. PATENT DOCUMENTS

| | | | |
|---|---|---|---|
| 2006/0136808 A1* | 6/2006 | Chirilov | G06F 17/246 |
| | | | 715/217 |
| 2007/0050700 A1 | 3/2007 | Simkhay et al. | |
| 2009/0228776 A1 | 9/2009 | Folting et al. | |
| 2009/0292987 A1* | 11/2009 | Sorenson | G06F 9/543 |
| | | | 715/255 |
| 2011/0072340 A1* | 3/2011 | Miller | G06F 17/246 |
| | | | 715/220 |

OTHER PUBLICATIONS

Panko, R.R., "Applying Code Inspection to Spreadsheet Testing," Journal of Management Information Systems 16(2):159-176, Fall 1999.

International Preliminary Report on Patentability mailed Mar. 9, 2017, issued in corresponding International Application No. PCT/US2015/043290, filed Jul. 31, 2015, 7 pages.

\* cited by examiner

| ROW NAME | ROW LABEL |
|---|---|
| | R-2 |
| PRECEDING ROW | R-1 |
| UPDATED ROW | R |
| FOLLOWING ROW | R+1 |
| | R+2 |

*FIG. 1*

| IDX | COLUMN |
|---|---|
| 1 | PARENT ROW |
| 2 | CHILD ROW |
| 3 | CHILD ROW |
| 4 | PARENT ROW |
| 5 | NEW ROW |
| 6 | PARENT ROW |

*FIG. 2C*

| IDX | COLUMN |
|---|---|
| 1 | PARENT ROW |
| 2 | CHILD ROW |
| 3 | CHILD ROW |
| 4 | PARENT ROW |
| 5 | NEW ROW |
| 6 | PARENT ROW |

*FIG. 2B*

| IDX | COLUMN |
|---|---|
| 1 | PARENT ROW |
| 2 | CHILD ROW |
| 3 | CHILD ROW |
| 4 | PARENT ROW |
| 5 | PARENT ROW |

*FIG. 2A*

| IDX | COLUMN 1 | FORMULA |
|---|---|---|
| 1 | 1 | |
| 2 | 2 | =[COLUMN 1]1 + 1 |
| 3 | 3 | =[COLUMN 1]2 + 1 |
| 4 | 4 | =[COLUMN 1]3 + 1 |

FIG. 4A

| IDX | COLUMN 1 | FORMULA |
|---|---|---|
| 1 | 1 | |
| 2 | 2 | =[COLUMN 1]1 + 1 |
| 3 | 3 | =[COLUMN 1]2 + 1 |
| 4 | | =[COLUMN 1]3 + 1 |
| 5 | 4 | =[COLUMN 1]3 + 1 |

FIG. 4B

| IDX | COLUMN 1 | FORMULA |
|---|---|---|
| 1 | 1 | |
| 2 | 2 | =[COLUMN 1]1 + 1 |
| 3 | 3 | =[COLUMN 1]2 + 1 |
| 4 | | =[COLUMN 1]3 + 1 |
| 5 | 4 | =[COLUMN 1]4 + 1 |

FIG. 4C

AUTOMATICALLY ADJUSTING SPREADSHEET FORMULAS AND/OR FORMATTING

CROSS-REFERENCE(S) TO RELATED APPLICATION(S)

This application claims the benefit of Provisional Application No. 62/040,992, filed Aug. 22, 2014, the entire disclosure of which is hereby incorporated by reference herein for all purposes.

BACKGROUND

Computing systems that provide the capability of managing data, formatting, and programming in an electronic spreadsheet format are common. Current tools for manually cutting and pasting rows and columns in spreadsheets, or copying selected rows, columns, or sections, help in building and editing spreadsheets. Traditionally, when a user adds a new row to such an electronic spreadsheet that has preexisting rows with a column of formulas or with particular formatting, the user must then manually copy and apply formulas from the existing rows to the new rows, and must also manually apply formatting to the new row to match the formatting of existing rows. A user must also check and fix as appropriate to ensure the correct syntax of certain items contained in the formulas, such as cell references, data ranges, and/or the like.

It is desirable to automate this process to maintain the integrity of calculations and design in complex spreadsheets during the creation process, rather than editorially. However, rules for automatic propagation of data and formatting in electronic spreadsheet documents are difficult to configure properly. This causes users to take steps to prevent changes caused by such automation, such as locking cells, turning off automated features, or writing scripts to constrain the automated formatting and formula copy features. Users may also find that they have to make manual corrections and overrides on the results of automated formatting and copy features applied to rows and cells in a spreadsheet.

Re-configuring automated features and manually making corrections is difficult at least because data, formatting, formulas and configuration settings in electronic spreadsheet programs are often accessed using unrelated portions of the user interface, and users are not often trained in their use and interdependencies. Thus, spreadsheet automation, user action, and design intention can be in conflict, and errors can thereby be introduced in the electronic spreadsheet. What is desired are systems and methods that are configured to automatically inspect, and copy, and apply appropriate information, including spreadsheet formulas and cell formatting, from existing rows to newly updated rows.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a computer-implemented method of automatically modifying a computerized information display is provided. The method comprises detecting, by a computing device, that a trigger indicating an updated row in a spreadsheet has been activated; reviewing, by the computing device, rows in the spreadsheet to determine if the updated row should be automatically modified; and, in response to identifying a peer row to be used to modify the updated row, modifying, by the computing device, the updated row based on the identified peer row.

In some embodiments, a nontransitory computer-readable medium having computer-executable instructions stored thereon is provided. In response to execution by one or more processors of a computing device, the instructions cause the computing device to perform actions for automatically modifying tabular data. The actions comprise detecting, by the computing device, that a trigger indicating an updated row in the tabular data has been activated; reviewing, by the computing device, rows in the tabular data to determine if the updated row should be automatically modified; and, in response to identifying a peer row to be used to modify the updated row, modifying, by the computing device, the updated row based on the identified peer row.

In some embodiments, a computing device configured to display, store, and manage tabular data is provided. The computing device is configured to detect activation of a trigger indicating that a row in a collection of tabular data has been updated, review rows other than the updated row in the collection of tabular data to identify a peer row to be used to modify the updated row, and automatically modify the updated row based on the identified peer row.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 1 is a table that illustrates terminology used throughout the present disclosure;

FIGS. 2A-2C are tables that illustrate various aspects of exemplary functionality of and terminology used within the present disclosure;

FIGS. 4A-4C illustrate an exemplary embodiment of a situation where formula fixing up would be applied according to various aspects of the present disclosure;

DETAILED DESCRIPTION

Figure 3:
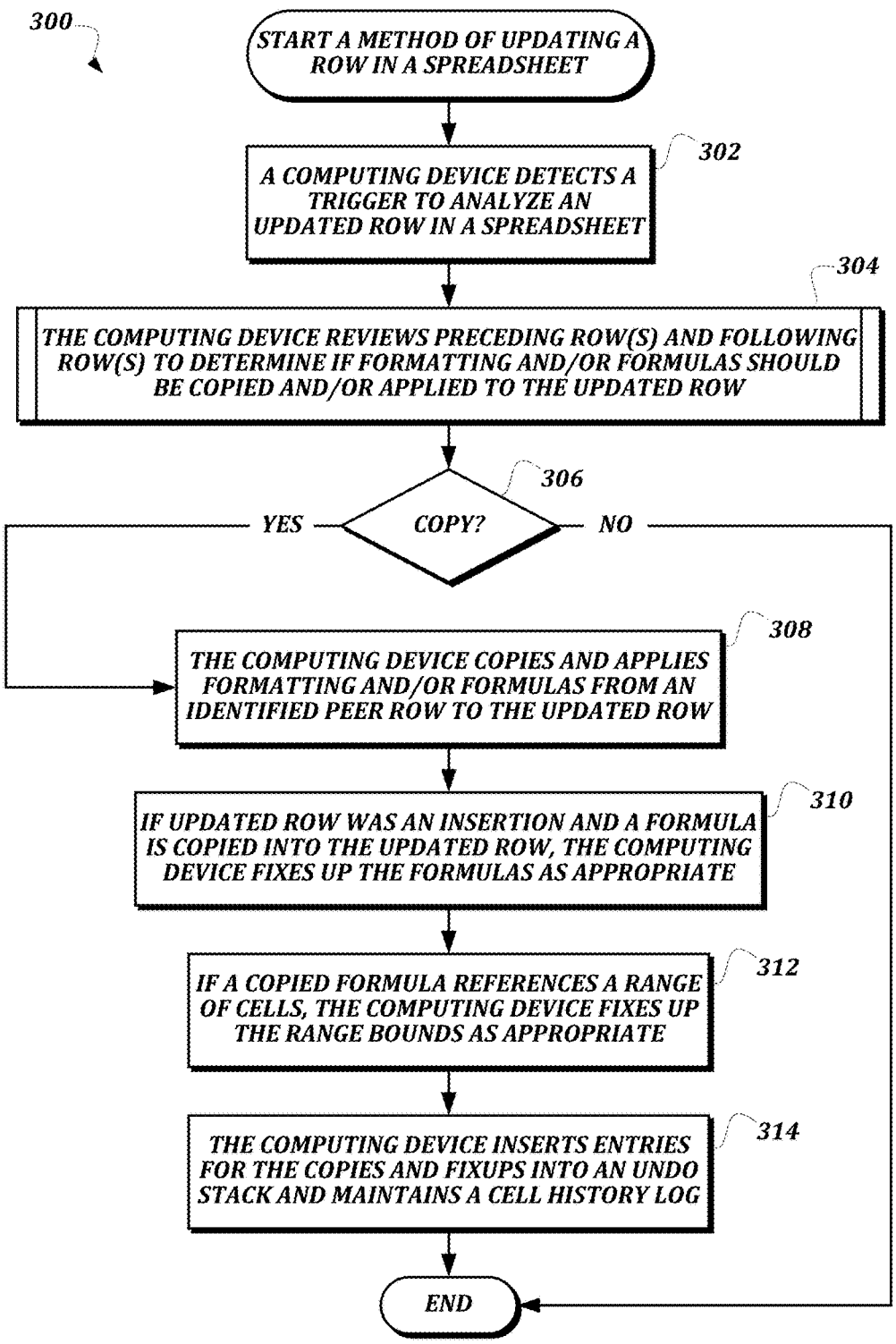
FIG. 3 is a flowchart that illustrates an exemplary embodiment of a method of updating a row in a spreadsheet according to various aspects of the present disclosure.

Spreadsheets have patterns in design and calculation, represented in the layout, formatting and formulas used in the spreadsheet. It is useful to repeat application of these patterns of formats and formulas at certain points, noting that peer rows in the grid hierarchy perform similar operations on the data in their given row. Matching this to the design of the spreadsheet maintains consistency of the evaluation performed by a spreadsheet, and simplifies review and editing.

In some embodiments, the present disclosure improves a computer-implemented spreadsheet management method by automatically identifying matching formatting and formulas from appropriate existing rows and applying them to an updated row. Embodiments of the present disclosure automatically evaluate and determine which rows, if any, are peer rows of the updated row in the spreadsheet hierarchy, and should be matched by copying and applying formatting and formulas to the updated row. Embodiments of the present disclosure may also automatically copy, apply, fix, and/or adapt formulas to the updated row and in other cells that are affected by, dependent upon, or programmed in reference to the updated row in order to maintain consistency throughout the spreadsheet.

In some embodiments, it is determined how to automatically apply the pattern—in design and calculation—defined by one or more peer rows to the updated row. Note that this description, while written describing spreadsheets, is applicable to automating the management of data, formatting and programming in other forms of electronic software that include data displayed or managed in tabular formats, including without limitation project management schedules, task lists, data lists, database tables, or other systems using information indexing and coordinate grids for the computation and display of information.

FIG. 1 is a table that illustrates terminology used throughout the present disclosure. The rows in the table illustrated in FIG. 1 each represent a row in a spreadsheet. The updated row 104, labeled "R," represents a row that will be manipulated by embodiments of the present disclosure. The updated row 104 is any row that was formerly blank or empty and has been updated to contain data. For example, the updated row 104 may be a newly inserted row in the middle of a range of previously existing rows. As another example, the updated row 104 may be a newly inserted row above or below a set of previously existing rows. As yet another example, the updated row 104 may have been an empty row already present in the spreadsheet that nevertheless did not have any data in it, or a row that previously contained data that was all deleted.

As illustrated in FIG. 1, a row 102 immediately above the updated row 104 is referred to as the "preceding row," and a row 106 immediately following the updated row 104 is referred to as the "following row." Rows may also be referred to herein by reference to their location with respect to the updated row 104. For example, the preceding row 102 is one row above or before the updated row 104, and therefore may be labeled as "R−1." Likewise, the following row 106 is one row after or below the updated row 104, and therefore may be labeled as "R+1." Rows that are further removed from the updated row 104 may be described similarly. For example, the row 108 that is two rows above the updated row 104 may be labeled "R−2," the row 110 that is two rows below the updated row 104 may be labeled "R+2," and so on.

FIG. 1 illustrates rows at a single hierarchical level for ease of illustration and discussion. However, in some embodiments, rows may be located at two or more hierarchical levels. In such embodiments, the preceding row and the following row with respect to an updated row may be the next row above or below the updated row that are also at a matching hierarchical level as the updated row, even if one or more rows at other hierarchical levels are between them.

Also, although a single row is illustrated as the updated row 104 for ease of discussion, in some embodiments more than a single row may be considered as the updated row 104. For example, if multiple rows are inserted as part of a paste operation, then all of the rows in the inserted range will be evaluated together as the updated row 104 with respect to determining which row is the preceding row 102 (the row above the range of pasted rows) and which row is the following row 106 (the row below the range of pasted rows). One of ordinary skill in the art will recognize that this terminology may be used to refer to further rows that are not illustrated in FIG. 1, such as rows three or more rows removed from the updated row 104. One of ordinary skill in the art will also recognize that some rows illustrated in FIG. 1 may not be present in particular cases, such as when the updated row 104 is at the top or bottom of a spreadsheet.

FIGS. 2A-2C are tables that illustrate various aspects of exemplary functionality of and terminology used within the present disclosure. FIG. 2A illustrates a table before a row is updated. The rows at indexes 1, 4, and 5 are at a first level of indentation, and the rows at indexes 2 and 3 are at a second level of indentation. Further, the rows at indexes 1, 4, and 5 include formatting having a dark background and are parent rows, while the rows at indexes 2 and 3 include formatting having a light background and are child rows. The hierarchy illustrated in the table is thus established. As used herein, the term "indentation level" represents a concept of shared logical, hierarchical relationships between rows in a spreadsheet design. In some embodiments, presence at a given indentation level or hierarchical level may be indicated at least in part by an amount of offset between content in the row and an edge of the row.

Using similar formatting for rows at a given indentation level that contrasts with that of other indentation levels allows a spreadsheet designer to indicate on the computer display indentation levels for rows in the spreadsheet, which in turn can make the hierarchy of rows apparent. Understanding the indentation level or location within a hierarchy of a row may be particularly important when programming behavior such as formula evaluation and applicable ranges depend on an indentation level of a row. Visual displays of program intent are useful when editing, correcting, and reviewing spreadsheets. The illustrated backgrounds in FIG. 2A are an example of formatting for illustration only, and the changes to the formatting are meant to illustrate from which rows the automated operations of the present disclosure would copy and apply formatting and formulas to the updated row.

FIG. 2B illustrates the table after a new row is added and the table has been processed as described herein. The updated row has been added at index 5, between the rows that were previously present at indexes 4 and 5. As discussed further below, the embodiment of the present disclosure would determine that the updated row is inserted between (or, in the alternate, "splits" or "divides") peer rows 4 and 5 (as numbered before the insertion), and so the matching formatting from rows 4 and 6 (as numbered after the insertion) is applied to the updated row. Accordingly, to represent this functionality, the updated row illustrated in FIG. 2B has the dark background formatting from rows 4 and 6.

In some embodiments, peer rows are identified for the copying, application, and adaptation of formatting and/or formulas based on the indentation level given the updated row. FIG. 2C illustrates the table once the indentation level of the updated row has been changed to the second level of indentation. After this indentation level change, some embodiments of the present disclosure will look to the other rows at the second level of indentation to search for and to identify peer rows, while ignoring rows at the first level of indentation (such as rows 4 and 6). As discussed further below, the embodiment of the present disclosure would determine that the updated row has been inserted below peer rows 2 and 3, and so the matching formatting from rows 2 and 3 is applied to the updated row. Accordingly, the updated row illustrated in FIG. 2C has the light background formatting from rows 2 and 3.

Though formulas are not specifically illustrated in FIGS. 2A-2C, one of ordinary skill in the art will recognize that the processing discussed above with respect to formatting is equally applicable to fixing up, applying, or otherwise adapting formulas as well.

In some embodiments of the present disclosure, automated changes are applied to an updated row from an automatically identified peer row. As used herein, "peer rows" are rows that logically match each other in various aspects of the design of the electronic spreadsheet. For example, rows may be considered to be peer rows that match each other if they are on the same level of hierarchy and/or indentation in the spreadsheet grid or table, and/or if they have matching features that would be copied to the updated row, such as identical formatting, matching formulas, and/or the like. Peer rows may or may not be directly adjacent to each other in the spreadsheet table or grid. One example of peer rows that are not directly adjacent to each other is if two matching rows at a given indentation or hierarchy level are separated by a row at a different indentation or hierarchy level, as illustrated in FIG. 2C. Formulas may match if they are either identical (that is, performing the same calculation on the same data) or equivalent but not identical. Formulas may be equivalent but not identical in situations such as formulas that include references to other cells, ranges of cells, or other specified data sources. For example, row 1 may include a formula such as "=SUM([Column A]1, [Column B]1)" to add the values in Column A and Column B from row 1, and row 2 may include a formula such as "=SUM([Column A]2, [Column B]2)" to add the values in Column A and Column B from row 2. Though these formulas are not identical, some embodiments of the present disclosure would determine that they match, apply the formula to the contents of the updated row, checking and correcting any dynamic cell and range references to ensure correct evaluation in the updated row, and checking and correcting any rows that reference the updated row.

Accordingly, a desired result provided by some embodiments of the present disclosure is, upon creating an updated or new row, to identify peer rows in the spreadsheet by matching rows to each other with reference to a location of the updated row; to automatically copy, apply and adapt formatting and formulas from the identified peer row(s) to the updated row; and to check/fix up cell references and data ranges in and depending upon the updated row in the spreadsheet to ensure proper formula evaluation.

FIG. 3 is a flowchart that illustrates an exemplary embodiment of a method 300 of updating a row in a spreadsheet according to various aspects of the present disclosure. From a start block, the method 300 proceeds to block 302, where a computing device detects a trigger to analyze an updated row in a spreadsheet. Various actions may cause the trigger to be detected. For example, in some embodiments, a trigger is detected for a blank row after the first entry to the blank row is committed, such as when a user enters a value into a cell in the blank row and then navigates out of the cell. As another example, in some embodiments, a trigger is detected for an updated row upon indent/outdent of the row. Once the outline level is changed, the updated row is compared to other rows at the new outline level. As yet another example, in some embodiments, a trigger is detected for an updated row when the updated row is inserted into a preexisting range, which may include formulas that are not static and that should be fixed by the method 300. Some other non-limiting examples of events that may cause a trigger to be detected include user interface interactions such as a key up or key down event, focus on the current edit field moving to or away from a cell in the updated row, actions that cause an edit to a cell in the updated row to be committed for spreadsheet evaluation, formatting actions in the updated row, a request to recalculate the electronic spreadsheet, gestures such as tapping or double tapping on a touchscreen interface to select or insert a row, copying/cutting and pasting a row, and/or the like.

Figure 5:
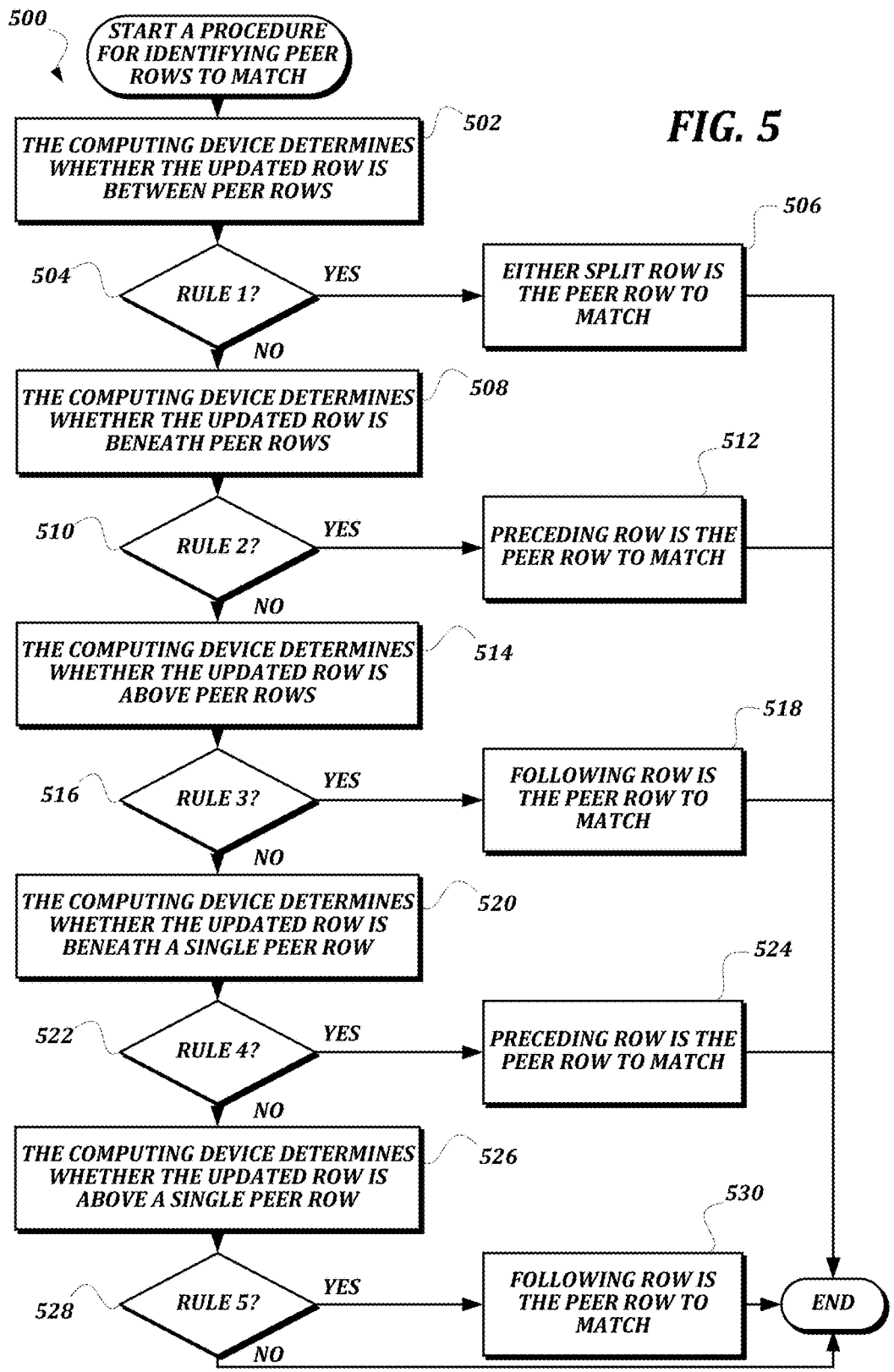
FIG. 5 is a flowchart that illustrates an exemplary embodiment of a procedure for identifying peer rows containing formatting and formulas to copy and apply according to various aspects of the present disclosure.

The method 300 then proceeds to a procedure block 304, where a procedure is performed wherein the computing device reviews preceding rows and following rows, if any exist in the spreadsheet, to determine if formatting and/or formulas should be copied and/or applied to the updated row. An example procedure for determining whether formatting and/or formulas should be copied and/or applied to the updated row is illustrated in FIG. 5 and described further below.

Once the procedure at procedure block 304 is completed, the method 300 proceeds to a decision block 306, where a test is performed based on the result of the procedure regarding whether there is formula and/or formatting information from another row that should be applied to the updated row. If the procedure did not identify a peer row from which formatting and/or formulas should be copied and/or applied, then the result of the test at decision block 306 is NO, and the method 300 proceeds to an end block and terminates.

Otherwise, if the procedure did identify a peer row from which formatting and/or formulas should be copied and/or applied to the updated row, then the result of the test at decision block 306 is YES, and the method 300 proceeds to block 308 where the computing device copies and applies formatting and/or formulas from an identified peer row to the updated row. In some embodiments, row-level formatting and cell-level formatting are copied from the peer row to the updated row. In some embodiments, equivalent formulas are copied from the peer row to the updated row. Equivalent formulas may be identical but for having dynamic reference values (such as cell, row, or range references) updated as appropriate for the location of the updated row.

In some embodiments, only some of the content from the peer row is copied. For example, any user-entered content in the updated row (such as text or formulas entered into a cell that caused the trigger to be detected at block 302) or user-applied formatting in the updated row is preserved, even if there is content or formatting in the peer row to be copied in the corresponding cell. As another example, any static values may not be copied to the updated row. Even if the static values might be copied if the user performed an action such as a "fill down" operation, the static values will not be copied into the updated row by the method 300, because it may create duplicates or cause the other rows to be unnecessarily re-indexed. In some embodiments, other information may appear in the updated row without having to be copied by the method 300. For example, system columns, column-level formatting, and sheet-level conditional formatting may be applied to the updated row when it is created, independent of the method 300 as described herein.

If an updated row is an insertion affecting a set of rows that have formulas with dynamic references to other rows, then the formulas may need to be updated elsewhere in the spreadsheet. Accordingly, at block 310, if the updated row was an insertion and a formula is copied into the updated row, the computing device fixes up the formulas as appropriate, including adjusting both static and dynamic cell references and formulas so that the spreadsheet will evaluate properly. FIGS. 4A-4C illustrate an exemplary embodiment of a situation where formula fixing up would be applied according to various aspects of the present disclosure. FIG. 4A illustrates a table having formulas with dynamic references to other rows. As understood by one of ordinary skill in the art, data is obtained from the referenced locations and is evaluated by the formula. As illustrated, explicit addresses for static cell references are used. That is, the formula in row 2 references a cell in row 1 (written as "[COLUMN 1]1" to reference "COLUMN 1" in row 1, which contains the value "1" in the referenced cell), and so on. Note, however, that relative references for cell locations or data ranges, or defined variable names for values in cell locations, could be used instead of static references without departing from the scope of the present disclosure.

FIG. 4B illustrates the table after an updated row was inserted at row 4, moving the existing row 4 down to row 5, and after the actions described at block 308 have been executed. As shown, an equivalent formula to the formula in the peer rows has been copied to the updated row, and the static value in Column 1 has not been copied. Though at this point the copying rules described above have been executed, it is clear that the logic of the formulas in the formula column is broken, in that the formula in row 4 and the formula in row 5 are the same, even though the spreadsheet intends the formula to logically represent "add 1 to the value stored in Column 1 from the above row."

FIG. 4C illustrates the table after the fixup actions of block 310 have been executed. As shown, the formula in row 5 has been updated to again properly refer to "the above row" instead of "the row two rows above." These fixup actions are important because the error introduced into the formulas illustrated in FIG. 4B may be hidden, in that the result of the formulas (as opposed to the formula text) is likely displayed to the user. As well, the lack of a static value in the updated row at Column 1, row 4 may easily be noticed and addressed by the user, marked with a visual cue (such as a variegated background, colored to alert the user of the need to enter a value, moving the cursor or edit field to the cell location as a prompt, and/or the like), or otherwise indicated for further attention. However, the error in the formula in the following row may be harder to detect and may be inadvertently overlooked if the spreadsheet is being manually checked for consistency after the update, rather than being automatically corrected as described herein.

Returning to FIG. 3, at block 312, if a copied formula references a range of cells, the computing device fixes up the range bounds as appropriate. For example, if the updated row is inserted into the middle of a range of cells and has a copied formula that references the range, the computing device updates the reference to the range in the copied formula, as well as in the matching formulas in other rows in the range, or those formulas otherwise dependent upon or referring to the updated row. As another example, if the updated row is inserted at the top or bottom of a range, the range bounds may only be updated if the formula with the range reference is considered the identified peer row. This situation may arise, for example, in a situation where an updated row is a previously blank row that is between a set of peer rows above the updated row and a different set of peer rows below the updated row. The procedure 500 illustrated in FIG. 5 would determine the preceding row to be the peer row to copy, and so the ranges in the preceding set of peer rows would be fixed along with the updated row, while the ranges in the following set of peer rows may not have adjustments applied.

In some embodiments, modification history for an electronic spreadsheet may be tracked in order to record what edits were made by which users, to provide undo functionality, and/or the like. Accordingly, at block 314, the computing device inserts entries for the modifications into an undo stack and maintains a cell history log. In some embodiments, separate entries may be created in the undo stack and cell history log for the fixups, for the formula copying, and/or for the format copying. In some embodiments, in the cell history, changes are attributed to the user who took the action that caused the trigger to be detected. The method 300 then proceeds to an end block and terminates.

FIG. 5 is a flowchart that illustrates an exemplary embodiment of a procedure 500 for identifying peer rows containing formatting and formulas to copy and apply according to various aspects of the present disclosure. As stated above, the procedure 500 is an example of a procedure suitable for use at block 304 of the method 300 illustrated in FIG. 3 and discussed above. Also, as noted above, references to a "preceding row," a "following row," split rows, and/or the like may, in some embodiments, refer to rows that are located at an indentation level or hierarchical level that matches the updated row, but that may be separated from the updated row and/or from each other by one or more rows at other indentation levels or hierarchical levels.

From a start block, the procedure 500 proceeds to block 502, where the computing device determines whether the updated row is between peer rows. The determination of whether the preceding row and the following row are peer rows is based on a determination of whether they match each other as described above. Next, at decision block 504, the procedure 500 branches based on the determination made in block 502. If the result of the determination at block 502 is that the updated row is located between peer rows, then the result of decision block 504 is YES, and the procedure 500 advances to block 506, where either one of the split rows is identified as the peer row to match. From block 506, the procedure 500 advances to an end block and terminates.

Otherwise, if the updated row was not determined to be between peer rows, then the result of decision block 504 is NO, and the procedure 500 advances to block 508. At block 508, the computing device determines whether the updated row is beneath peer rows. The updated row is beneath peer rows if the preceding row (R−1) and the row before the preceding row (R−2) are peer rows of each other (i.e., if R−1 and R−2 match each other).

Next, at decision block 510, the procedure 500 branches based on the determination made in block 508. If the result of the determination at block 508 is that the updated row was beneath peer rows, then the result of decision block 510 is YES, and the procedure 500 advances to block 512, where the preceding row (R−1) is identified as the peer row to match. From block 512, the procedure 500 advances to an end block and terminates.

Otherwise, if the updated row was not determined to have been beneath peer rows, then the result of decision block 510 is NO, and the procedure 500 advances to block 514. At block 514, the computing device determines whether the updated row is above peer rows. The updated row is above peer rows if the following rows, row (R+1) and row (R+2), are peer rows of each other (i.e., if R+1 and R+2 match each other).

Next, at decision block 516, the procedure 500 branches based on the determination made in block 514. If the result of the determination at block 514 is that the updated row was above peer rows, then the result of decision block 516 is YES, and the procedure 500 advances to block 518, where the following row (R+1) is identified as the peer row to match. From block 518, the procedure 500 advances to an end block and terminates.

Otherwise, if the updated row was not determined to have been above peer rows, then the result of decision block 516 is NO, and the procedure 500 advances to block 520. At block 520, the computing device determines whether the updated row is beneath a single peer row. The updated row is beneath a single peer row if the preceding row (R−1) has formatting and/or formulas to be copied and/or applied and the row before the preceding row (R−2) is blank, empty, or does not exist because the preceding row is the first row in the spreadsheet (or is the first row in the spreadsheet at an indentation level or hierarchical level that matches that of the updated row).

Next, at decision block 522, the procedure 500 branches based on the determination made in block 520. If the result of the determination at block 520 is that the updated row was beneath a single peer row, then the result of decision block 522 is YES, and the procedure 500 advances to block 524, where the preceding row (R−1) is identified as the peer row to match. From block 524, the procedure 500 advances to an end block and terminates.

Otherwise, if the updated row was not determined to have been beneath a single peer row, then the result of decision block 522 is NO, and the procedure 500 advances to block 526. At block 526, the computing device determines whether the updated row is above a single peer row. The updated row is above a single peer row if the following row (R+1) has formatting and/or formulas to be copied and/or applied and the row after the following row (R+2) is blank, empty, or does not exist because the following row is the last row in the spreadsheet (or is the last row in the spreadsheet at an indentation level or hierarchical level that matches that of the updated row).

Next, at decision block 528, the procedure 500 branches based on the determination made in block 526. If the result of the determination at block 526 is that the updated row was above a single peer row, then the result of decision block 528 is YES, and the procedure 500 advances to block 530, where the following row (R+1) is identified as the peer row to match. From block 530, the procedure 500 advances to an end block and terminates.

Otherwise, if the updated row was not determined to have been above a single peer row, then the result of decision block 528 is NO. At this point, no row was able to be determined to be a peer row to match, and the procedure 500 will indicate this result. The procedure 500 then advances to the end block and terminates. On termination of the procedure 500, the identified peer row (or the indication of no match) is provided to the caller, such as to block 304 of the method 300 described above.

One of ordinary skill in the art will recognize that, though YES and NO decisions are illustrated in FIG. 5, the overall effect of the decisions is a cascading evaluation in which multiple rules are evaluated in a given order until a successful result is obtained. While one order for these rules is illustrated in FIG. 5, one of ordinary skill in the art will recognize that in some embodiments, a different order for these rules may be used instead without departing from the spirit of the present disclosure. Likewise, in some embodiments, more or fewer rules may be included in the cascading evaluation than those illustrated in FIG. 5.

In some embodiments, the operations described above may be applied to multiple updated rows at once. As one example of how multiple rows may be updated at the same time, a paste operation may be used to insert multiple rows into a spreadsheet in a group. Because multiple rows may be updated at once, it is possible that that the updated rows are not all at the same indentation level or hierarchical level. Accordingly, in some embodiments of the present disclosure, updated rows of a plurality of rows updated at once may be updated based on different peer rows in the spreadsheet depending on the indentation level or hierarchical level of the given updated row. This is illustrated as follows.

Figures 6A, 6B, 6C:
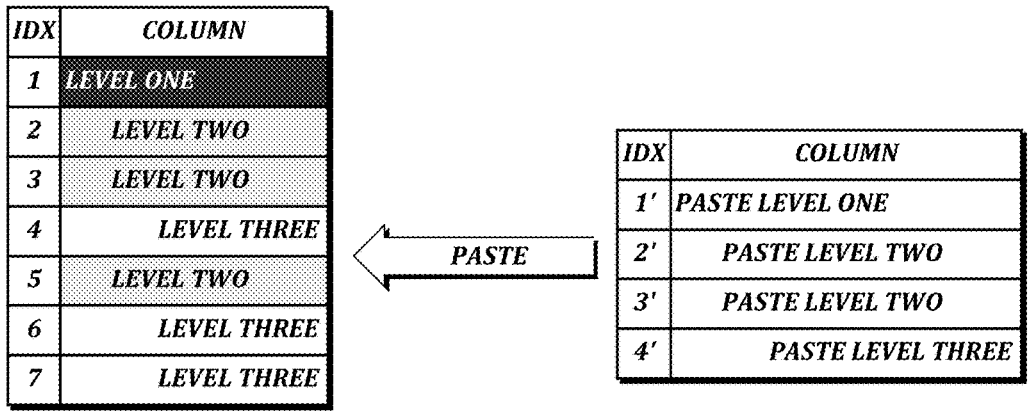
FIGS. 6A-6C illustrate an exemplary embodiment of a situation where a plurality of updated rows are treated differently based on their associated hierarchical levels.

FIGS. 6A-6C illustrate an exemplary embodiment of a situation where a plurality of updated rows are treated differently based on their associated hierarchical levels. FIG. 6A illustrates a spreadsheet having rows 1-7. Rows 1-7 include three hierarchical levels having different formatting: level one (row 1) has a black background with white text; level two (rows 2, 3, and 5) has a gray background with black text; and level three (rows 4, 6, and 7) has a white background with black text. Into this spreadsheet, four rows (row 1' to row 4') are to be pasted in a group between rows 4 and 5. The four rows to be pasted are also at three hierarchical levels, but do not have formatting that matches the existing rows. FIG. 6B illustrates the spreadsheet after rows 1'-4' have been pasted in, and before any formatting has been applied. The pasted rows (now rows 5-8) still have the formatting that they had before, and do not yet match the other rows in the spreadsheet.

FIG. 6C illustrates the spreadsheet after an embodiment of the present disclosure has copied and/or applied formatting from peer rows to the updated rows. As illustrated, each hierarchical level within the updated rows is processed separately to match other rows at the same hierarchical level. Thus, row 1 was identified as the peer row to match for row 5 because it is the preceding row at the first hierarchical level, and so row 5 now has a black background and white text. For rows 6 and 7, either of rows 3 or 9 were identified as the peer row to match because rows 6 and 7 are between them. Accordingly, rows 6 and 7 now have gray backgrounds with black text. Similarly, row 8 has had formatting applied to match peer rows 4 and 10 that it is located between.

Figure 7:
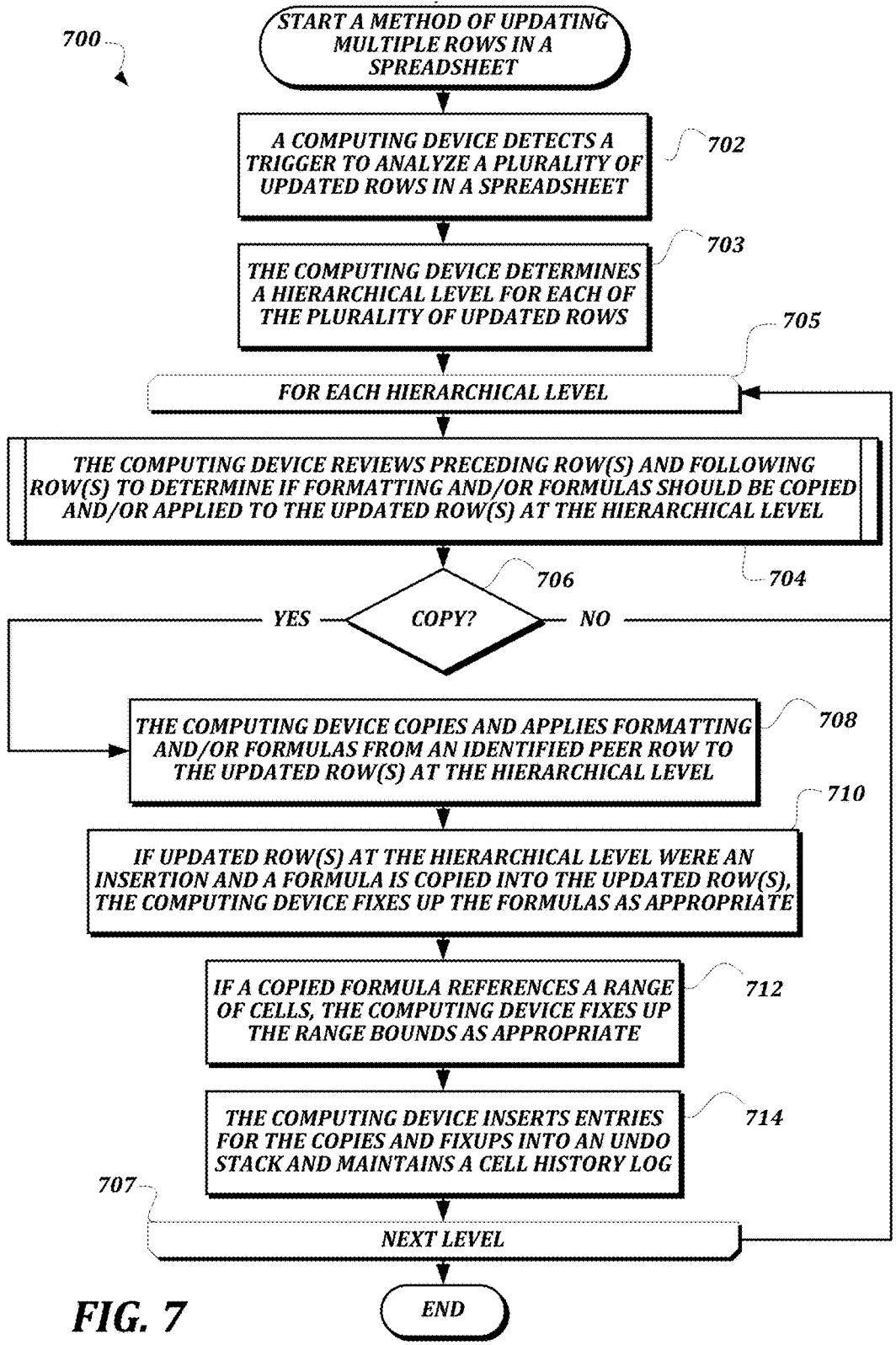
FIG. 7 is a flowchart that illustrates an exemplary embodiment of a method of updating multiple rows in a spreadsheet according to various aspects of the present disclosure.

FIG. 7 is a flowchart that illustrates an exemplary embodiment of a method 700 of updating multiple rows in a spreadsheet according to various aspects of the present disclosure. The method 700 is generally similar to the method 300 illustrated in FIG. 3 and discussed above, but includes at least one difference: instead of applying and/or copying the same changes to one or more updated rows, the method 700 processes each of multiple updated rows according to the indentation level or hierarchical level of each given updated row to produce results similar to those illustrated in FIG. 6C.

From a start block, the method 700 proceeds to block 702, where a computing device detects a trigger to analyze a plurality of updated rows in a spreadsheet. As described with respect to block 302 in FIG. 3, various actions may cause the trigger to be detected. Because the trigger detected in block 702 indicates a plurality of updated rows, it is likely that the action which causes the trigger to be detected is a paste of a set of updated rows. However, in some embodiments, other actions similar to those discussed above with respect to block 302 may cause a trigger to be created that indicates a plurality of updated rows.

Next, at block 703, the computing device determines a hierarchical level for each of the plurality of updated rows. For example, as illustrated in FIG. 6B, the computing device would determine that row 4 is at a first hierarchical level, rows 6 and 7 are at a second hierarchical level, and row 8 is at a third hierarchical level. One of ordinary skill in the art will recognize that the actual position of the level (i.e., root level, first sublevel, second sublevel, and so on) is not material, but instead the determination of the hierarchical level is used to identify other rows within the plurality of updated rows at a matching hierarchical level, and to identify peer rows to match at a matching hierarchical level.

The method 700 then proceeds to a for loop defined between a for loop start block 705 and a for loop end block 707. The for loop is executed for each of the hierarchical levels that were determined in the plurality of updated rows, thus processing each hierarchical level within the plurality of updated rows separately. Accordingly, from the for loop start block 705, the method 700 proceeds to a procedure block 704, where a procedure is performed wherein the computing device reviews preceding row(s) and following row(s) to determine if formatting and/or formulas should be copied and/or applied to the updated row(s) at the hierarchical level. As with procedure block 304 from FIG. 3, the procedure illustrated in FIG. 5 and described above is a suitable example procedure that may be executed in procedure block 704. In the procedure, preceding row(s) and following row(s) at the given hierarchical level being processed by the for loop are reviewed, and rows at other hierarchical levels are ignored.

Once the procedure at procedure block 704 is completed, the method 704 proceeds to a decision block 706, where a test is performed based on the result of the procedure regarding whether there is formula and/or formatting information from another row that should be applied to the updated row(s) at the hierarchical level. If the procedure did not identify a peer row from which formatting and/or formulas should be copied and/or applied, then the result of the test at decision block 706 is NO, and the method 700 returns to the for loop start block 705 to process the next hierarchical level, if any remain.

Otherwise, if the procedure did identify a peer row from which formatting and/or formulas should be copied and/or applied to the updated row(s) at the hierarchical level, then the result of the test at decision block 706 is YES, and the method 700 proceeds to block 708 where the computing device copies and applies formatting and/or formulas from an identified peer row to the updated row. At block 710, if updated row(s) at the hierarchical level were an insertion and a formula is copied into the updated row(s), the computing device fixes up the formulas as appropriate. At block 712, if a copied formula references a range of cells, the computing device fixes up the range bounds as appropriate, and at block 714, the computing device inserts entries for the copies and fixups into an undo stack and maintains a cell history log. Details of the actions performed in blocks 708, 710, 712, and 714 are similar to those discussed above with respect to blocks 308, 310, 312, and 314 of FIG. 300, respectively, but differ in that the actions are applied to one or more rows of the plurality of updated rows that are at the given hierarchical level currently being processed by the for loop instead of all of the updated rows.

The method 700 then proceeds to the for loop end block 707. If more hierarchical levels remain to be processed, then the method 700 returns to the for loop start block 705. Otherwise, if all of the hierarchical levels have been processed, then the method 700 proceeds to an end block and terminates.

In some embodiments, the functionality described above treats hidden rows and locked columns as if they were visible and unlocked. In both cases, the patterns in the spreadsheet still exist, and the user is more likely to want the data patterns to hold regardless of whether rows are hidden and/or columns are locked. This may lead to non-intuitive functionality, in that an authorized action taken by a user may cause changes to hidden rows or locked columns for which the user does not have authority to view or edit. Regardless of the non-intuitive nature of this result, the result is nevertheless maintains consistency between peer rows in the spreadsheet.

Figure 8:
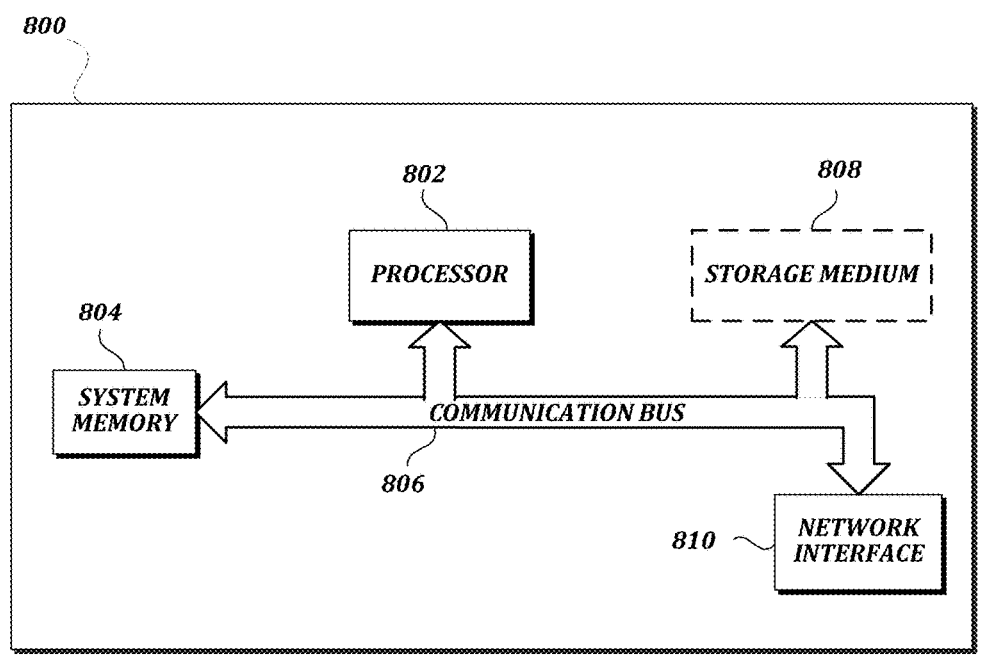
FIG. 8 is a block diagram that illustrates aspects of an exemplary computing device appropriate for use with embodiments of the present disclosure.

One of ordinary skill in the art will recognize that the figures and other disclosure provided above describe spreadsheet functionality provided by a computing device. Such functionality is provided by a computing device and is used to organize, format, display, and automatically manage information in a tabular format that is stored on a computer-readable medium. FIG. 8 is a block diagram that illustrates aspects of an exemplary computing device 800 appropriate for use with embodiments of the present disclosure. While FIG. 8 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 800 may be any one of any number of currently available or yet to be developed devices.

In its most basic configuration, the computing device 800 includes at least one processor 802 and a system memory 804 connected by a communication bus 806. Depending on the exact configuration and type of device, the system memory 804 may be volatile or nonvolatile memory, such as read only memory ("ROM"), random access memory ("RAM"), EEPROM, flash memory, or similar memory technology. Those of ordinary skill in the art and others will recognize that system memory 804 typically stores data and/or program modules that are immediately accessible to and/or currently being operated on by the processor 802. In this regard, the processor 802 may serve as a computational center of the computing device 800 by supporting the execution of instructions.

As further illustrated in FIG. 8, the computing device 800 may include a network interface 810 comprising one or more components for communicating with other devices over a network. Embodiments of the present disclosure may access basic services that utilize the network interface 810 to perform communications using common network protocols. The network interface 810 may also include a wireless network interface configured to communicate via one or more wireless communication protocols, such as WiFi, 2G, 3G, LTE, WiMAX, Bluetooth, and/or the like.

In the exemplary embodiment depicted in FIG. 8, the computing device 800 also includes a storage medium 808. However, services may be accessed using a computing device that does not include means for persisting data to a local storage medium. Therefore, the storage medium 808 depicted in FIG. 8 is represented with a dashed line to indicate that the storage medium 808 is optional. In any event, the storage medium 808 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 804 and storage medium 808 depicted in FIG. 8 are merely examples of computer-readable media. Computer-readable media can be used to store data for use by programs. Accordingly, the terms "electronic spreadsheet," "grid," "table," "cell," "spreadsheet data," "sheet data," "column entry," "row entry," and others used herein describe display formats and logical inter-relationships for information stored on a computer-readable medium of a computing device 800.

Suitable implementations of computing devices that include a processor 802, system memory 804, communication bus 806, storage medium 808, and network interface 810 are known and commercially available. For ease of illustration and because it is not important for an understanding of the claimed subject matter, FIG. 8 does not show some of the typical components of many computing devices. In this regard, the computing device 800 may include input devices, such as a keyboard, keypad, mouse, microphone, touch input device, touch screen, tablet, and/or the like. Such input devices may be coupled to the computing device 800 by wired or wireless connections including RF, infrared, serial, parallel, Bluetooth, USB, or other suitable connections protocols using wireless or physical connections. Similarly, the computing device 800 may also include output devices such as a display, speakers, printer, etc. Since these devices are well known in the art, they are not illustrated or described further herein.

As will be appreciated by one skilled in the art, the specific routines described above in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Computer interfaces may be included that allow users and/or other software processes to input conditions and/or rules, and/or to inspect, modify, test, customize, re-order, or prioritize one or more rules or processes used by embodiments of the present disclosure. Further, these FIGURES may graphically represent code to be programmed into a computer-readable storage medium associated with a computing device.

While illustrative embodiments have been illustrated and described, it will be appreciated that various changes can be made therein without departing from the spirit and scope of the present disclosure.

The invention claimed is:

1. A computer-implemented method of automatically modifying a computerized information display, the method comprising:

detecting, by a computing device, that a trigger has been activated, wherein the trigger indicates an updated row in a spreadsheet, and wherein the updated row is at a first indent level;

identifying, by the computing device, a set of peer rows of the updated row, wherein identifying the set of peer rows of the updated row comprises:

determining at least two existing rows of the spreadsheet other than the updated row that are also at the first indent level and are separated from each other by at least one row at a different indent level;

comparing at least one of row-level formatting, cell-level formatting, and formulas of the at least two existing rows to each other; and in response to determining that at least one of the row-level-formatting, cell-level formatting, and formulas of the at least two existing rows match, designating the at least two existing rows as an identified set of peer rows of the updated row; and modifying, by the computing device, the updated row based on at least one of a formula or formatting from the identified set of peer rows of the updated row.

2. The computer-implemented method of claim 1, wherein the updated row is a new inserted row and the trigger is activated upon insertion of the updated row.

3. The computer-implemented method of claim 1, wherein the updated row is an edited existing row and the trigger is activated upon editing of the updated row, wherein editing of the updated row includes one or more of indenting the updated row, adding data to a cell in the updated row, a change in focus to or from a cell in the updated row, a save event, and a recalculation request.

4. The computer-implemented method of claim 1, wherein modifying the updated row based on at least one of a formula or formatting from the identified set of peer rows of the updated row includes at least one of:

modifying formatting in the updated row based on formatting in a row of the identified set of peer rows, and adding formulas to the updated row based on formulas in a row of the identified set of peer rows.

5. The computer-implemented method of claim 1, wherein modifying the updated row based on at least one of a formula or formatting from the identified set of peer rows of the updated row includes:

adding formulas to the updated row based on formulas in a row of the identified set of peer rows; and updating row references in the formulas added to the updated row to reflect a position of the updated row.

6. The method of claim 1, further comprising:

detecting, by the computing device, that a second trigger has been activated, wherein the second trigger indicates a second updated row in the spreadsheet;

identifying, by the computing device, a set of peer rows of the second updated row, wherein identifying the set of peer rows of the second updated row includes designating at least one existing row as an identified set of peer rows of the second updated row; and modifying, by the computing device, the second updated row based on at least one of a formula or formatting from the identified set of peer rows of the second updated row.

7. The computer-implemented method of claim 6, wherein identifying the set of peer rows of the second updated row includes comparing at least one of row-level formatting, cell-level formatting, and formulas of a preceding row of the second updated row and a following row of the second updated row; and wherein designating at least one existing row as the identified set of peer rows of the second updated row includes, in response to determining that at least one of the row-level formatting, cell-level formatting, and formulas of the preceding row and the following row match, designating the preceding row and the following row as the identified set of peer rows of the second updated row.

8. The computer-implemented method of claim 6, wherein identifying the set of peer rows of the second updated row includes comparing at least one of row-level formatting, cell-level formatting, and formulas of a preceding row of the second updated row and a row above the preceding row of the second updated row; and wherein designating at least one existing row as the identified set of peer rows of the second updated row includes, in response to determining that at least one of the row-level formatting, cell-level formatting, and formulas of the preceding row and the row above the preceding row match, designating the preceding row and the row above the preceding row as the identified set of peer rows of the second updated row.

9. The computer-implemented method of claim 8, further comprising, in response to determining that at least one of the row-level formatting, cell-level formatting, and formulas of the preceding row and the row above the preceding row match:
modifying a range in a formula in the preceding row to include the second updated row; and
not modifying a range in a formula in a following row to include the second updated row.

10. The computer-implemented method of claim 6, wherein identifying the set of peer rows of the second updated row includes comparing at least one of row-level formatting, cell-level formatting, and formulas of a following row of the second updated row and a row below the following row of the second updated row; and wherein designating at least one existing row as the identified set of peer rows of the second updated row includes, in response to determining that at least one of the row-level formatting, cell-level formatting, and formulas of the following row and the row below the following row match, designating the following row and the row below the following row as the identified set of peer rows of the second updated row.

11. The computer-implemented method of claim 6, wherein designating at least one existing row as the identified set of peer rows of the second updated row includes:
in response to determining that a preceding row of the second updated row has formatting or formulas to be copied or applied to the second updated row, and that either the row above the preceding row is blank, the row above the preceding row is empty, or the preceding row is the first row in the spreadsheet, designating the preceding row as the set of peer rows of the second updated row.

12. The computer-implemented method of claim 6, wherein designating at least one existing row as the identified set of peer rows of the second updated row includes:
in response to determining that a following row of the second updated row has formatting or formulas to be copied or applied to the second updated row, and that either the row below the following row is blank, the row below the following row is empty, or the following row is the last row in the spreadsheet, designating the following row as the set of peer rows of the second updated row.

13. A nontransitory computer-readable medium having computer-executable instructions stored thereon that, in response to execution by one or more processors of a computing device, cause the computing device to perform actions for automatically modifying tabular data, the actions comprising:
detecting, by the computing device, that a trigger has been activated, wherein the trigger indicates an updated row in a spreadsheet, and wherein the updated row is at a first indent level;
identifying, by the computing device, a set of peer rows of the updated row, wherein identifying the set of peer rows of the updated row comprises:
determining at least two existing rows of the spreadsheet other than the updated row that are also at the first indent level and are separated from each other by at least one row at a different indent level;
comparing at least one of row-level formatting, cell-level formatting, and formulas of the at least two existing rows to each other; and
in response to determining that at least one of the row-level-formatting, cell-level formatting, and formulas of the at least two existing rows match, designating the at least two existing rows as an identified set of peer rows of the updated row; and
modifying, by the computing device, the updated row based on at least one of a formula or formatting from the identified set of peer rows of the updated row.

14. The computer-readable medium of claim 13, wherein the actions further comprise:
detecting, by the computing device, that a second trigger has been activated, wherein the second trigger indicates a second updated row in the spreadsheet;
identifying, by the computing device, a set of peer rows of the second updated row, wherein identifying the set of peer rows of the second updated row includes designating at least one existing row as an identified set of peer rows of the second updated row; and
modifying, by the computing device, the second updated row based on at least one of a formula or formatting from the identified set of peer rows of the second updated row.

15. The computer-readable medium of claim 14, wherein identifying a set of peer rows of the second updated row includes:
determining whether the second updated row is between peer rows by determining whether at least one of row-level formatting, cell-level formatting, and formulas of a preceding row of the second updated row and a following row of the second updated row match, and designating the preceding row of the second updated row and the following row of the second updated row as the identified set of peer rows in response to determining that the second updated row is between peer rows;
in response to determining that the second updated row is not between peer rows, determining whether the second updated row is at the bottom of peer rows by determining whether at least one of row-level formatting, cell-level formatting, and formulas of a preceding row of the second updated row and a row above the preceding row of the second updated row match, and designating the preceding row to the second updated row as the identified set of peer rows in response to determining that the second updated row is at the bottom of peer rows;

in response to determining that the second updated row is neither between peer rows nor at the bottom of peer rows, determining whether the second updated row is at the top of peer rows by determining whether at least one of row-level formatting, cell-level formatting, and formulas of a following row of the second updated row and a row below the following row of the second updated row match, and designating the following row to the second updated row as the identified set of peer rows in response to determining that the second updated row is at the top of peer rows;

in response to determining that the second updated row is neither between peer rows, nor at the bottom of peer rows, nor at the top of peer rows, determining whether the updated row is at the bottom of a single peer row by determining whether the preceding row of the second updated row has formatting or formulas to be copied or applied to the second updated row and that either the row above the preceding row is blank, the row above the preceding row is empty, or the preceding row is the first row in the spreadsheet, and designating the preceding row to the second updated row as the identified set of peer rows in response to determining that the second updated row is at the bottom of a single peer row; and in response to determining that the second updated row is neither between peer rows, nor at the bottom of peer rows, nor at the top of peer rows, nor at the bottom of a single peer row, determining whether the updated row is at the top of a single peer row by determining whether the following row of the second updated row has formatting or formulas to be copied or applied to the second updated row and that either the row below the following row is blank, the row below the following row is empty, or the following row is the last row in the spreadsheet, and designating the following row to the second updated row as the identified set of peer rows in response to determining that the second updated row is at the top of a single peer row.

16. The computer-readable medium of claim 13, wherein modifying the updated row based on at least one of a formula or formatting from the identified set of peer rows of the updated row includes at least one of:
modifying formatting in the updated row based on formatting in a row of the identified set of peer rows, and
adding formulas to the updated row based on formulas in a row of the identified set of peer rows.

17. The computer-readable medium of claim 13, wherein modifying the updated row based on at least one of a formula or formatting from the identified set of peer rows of the updated row includes:
adding formulas to the updated row based on formulas in a row of the identified set of peer rows; and
updating row references in the formulas added to the updated row to reflect a position of the updated row.

18. A computing device configured to display, store, and manage tabular data by performing actions comprising:
detecting that a trigger has been activated, wherein the trigger indicates an updated row in a spreadsheet, and wherein the updated row is at a first indent level;
identifying a set of peer rows of the updated row, wherein identifying the set of peer rows of the updated row comprises:
determining at least two existing rows of the spreadsheet other than the updated row that are also at the first indent level and are separated from each other by at least one row at a different indent level;
comparing at least one of row-level formatting, cell-level formatting, and formulas of the at least two existing rows to each other; and
in response to determining that at least one of the row-level-formatting, cell-level formatting, and formulas of the at least two existing rows match, designating the at least two existing rows as an identified set of peer rows of the updated row; and
modifying the updated row based on at least one of a formula or formatting from the identified set of peer rows of the updated row.

* * * * *